United States Patent [19]

Marcus

[11] Patent Number: 4,813,074
[45] Date of Patent: Mar. 14, 1989

[54] METHOD OF AND DEVICE FOR SEGMENTING AN ELECTRIC SIGNAL DERIVED FROM AN ACOUSTIC SIGNAL

[75] Inventor: Stephen M. Marcus, Eindhoven, Netherlands

[73] Assignee: U.S. Philips Corp., New York, N.Y.

[21] Appl. No.: 930,835

[22] Filed: Nov. 14, 1986

[30] Foreign Application Priority Data

Nov. 29, 1985 [NL] Netherlands ............... 8503304

[51] Int. Cl.$^4$ ............... G10L 7/02
[52] U.S. Cl. ............... 381/36; 364/513.5
[58] Field of Search ............... 381/29–51; 364/513, 513.5

[56] References Cited

FOREIGN PATENT DOCUMENTS 0227146 1/1987 European Pat. Off. ............... 381/41
8404194 10/1984 PCT Int'l Appl.

OTHER PUBLICATIONS

"Segmentation for Data Reduction in Isolated Word Recognition", R. Brown, IEEE ICASSP, May 3–5, 1982, pp. 1262–1265.
"An Investigation of Temporal Decomposition of Speech Parameters for Automatic Segmentation of Speech", E. A. Zuk, IPO Report, 4/29/84, pp. 1–52.
"Temporal Decomposition of Speech", Marcus et al, IPO Annual Progress Report 19, 1984 pp. 25–31.
"Efficient Coding of LPC Parameters by Temporal Decomposition", Atal, B.S., International Conference on Acoustics, Speech and Signal Processing, Boston, 1983, pp. 81–84.

Primary Examiner—Patrick R. Salce
Assistant Examiner—Emanuel Todd Voeltz
Attorney, Agent, or Firm—Bernard Franzblau

[57] ABSTRACT

A method and device for segmenting an electric (acoustic) signal. A number of parameters, for example "log area" parameters, are derived as a function of time from the electric signal (block 2). For consecutive instants the signals of the parameters located within a time interval around each instant are taken up and transition functions ($\phi_i$) are derived therefrom for each instant (block 3). Subsequently similarity factors ($c_{ij}$) are determined each between two transition functions ($\phi_i$ and $\phi_j$) associated with respective proximate instants (i and j) (block 4) and a replacing transition function ($\phi_{ij}^c$) is derived (block 6) from the transition functions of at least one group of two transition functions for which the associated similarity factor is larger than a reference value V, the transition function ($\phi_{ij}^c$) replace the aforementioned transition functions from which it is derived (block 7).

A combined transition function ($\phi_{ij}^c$) replacing one of these transition functions is preferably calculated from the aforementioned transition functions, while the other of these transition functions are omitted. The group of transition functions for which the similarity factor is largest is preferably taken (block 5). The method is subsequently repeated (FIG. 1). Transition functions obtained are very suitable for use in the transmission or recognition of speech signals and for coding diphones.

18 Claims, 4 Drawing Sheets

METHOD OF AND DEVICE FOR SEGMENTING AN ELECTRIC SIGNAL DERIVED FROM AN ACOUSTIC SIGNAL

BACKGROUND OF THE INVENTION

This invention relates to a method of segmenting an electrical signal derived from an acoustic signal in which, consecutively, a number of parameters is derived from the electric signal as a function of time, the signal, of the parameters located within a time interval around each instant are taken up for consecutive instants, a transition function $\emptyset$ is determined for each instant from the signals of the parameters located within the associated time interval, and information relating to the segments from which the acoustic signal is built up is derived from the transition functions associated with the instants.

The invention also relates to a device for performing the method,. A method of the type defined in the opening paragraph is disclosed in PTC Application No. WO 84/04194.

The Application describes a temporal decomposition method by B. S. Atal for economically coding and subsequently transmitting speech, which method determines the acoustic vectors and their associated transition functions for an utterance. Atal describes a procedure for determining a transition function which is most centrally located in a certain time interval. Consecutive transition functions can be determined by shifting the time interval over small time steps. For a detailed description of the method reference is made to the publication "Efficient coding of LPC parameters by temporal decomposition" by B. S. Atal in ICASSP 83, the proceedings pp. 81–84 and to the publication "Temporal decomposition of speech" by S. M. Marcus et al, 1984 IPO annual progress report no. 19, page 25 etc.

Atal's method uses a mathematical procedure yielding transition functions (and associated acoustic vectors) which in practice show little resemblance to phonetically relevant events in the speech signal.

E. A. Zuk has found that the known method has a considerable drawback which becomes particularly manifest if phonetically relevant events in the speech signal were to be fixed by means of the known method, see E. A. Zuk "An investigation of temporal decomposition of speech parameters for automatic segmentation of Speech", IPO report No. 459. Zuk found that small variations in, for example, the length of the time interval had a great influence on the transition functions obtained by means of the known method. Particularly if a physical relationship is desired between acoustic vectors from which the speech signal is built up and phonetically relevant events in the speech signal, this great influence is very undesirable. In fact, it would mean that a different choice of the length of the time window at a given instant during the speech signal would lead to a different acoustic vector in the relevant time window.

SUMMARY OF THE INVENTION

It is an object of the invention to obviate this drawback and to provide a method and a device which are less dependent on the choice of, for example, the length of the time intervals so that a speech signal can be segmented in a better way into temporally overlapping events which are closely related to the phonetically relevant events in the speech signal.

To this end the method according to the invention is characterized in that (a) similarity factors $C_{ij}$ are determined each between two transition functions ($\emptyset_i$ and $\emptyset_j$) associated with respective proximate instants i and j, and (b) a replacing transition function is derived from the transition functions of at least one group of two transition functions for which the associated similarity factor is larger than a reference value V, the said replacing transition function replacing the aforementioned transition functions from which it is derived.

Atal's method of obtaining the information relating to the segments determines a transition function and its associated centre of gravity for each instant and the difference between the instant with which the transition function was associated and the centre of gravity is plotted along the time axis. The sawtooth-shaped curve as shown in FIG. 11 of WO No. 84/04194 is then obtained. The desired information, for example the real number of transition functions which is required to temporally describe the speech signal, can then be determined from this curve.

Unlike the known method all transition functions are now completely stored (at any rate that part of the transition functions within the time interval having a value—clearly—differing from zero) and are further processed. The replacing transition functions obtained in accordance with the invention are found to be much less sensitive to variations in measuring circumstances such as, for example, the choice of the size of the time window used.

All this renders a method according to the invention very suitable for application in speech recognition, an application which was not easily possible with the known method.

The replacing transition function may be derived in different ways.

A first possibility is to combine transition functions and calculate a combined transition function therefrom. The replacing transition function is then referred to as a combined transition function. For example, two transition functions from one group can be combined. Transition functions from two or more groups can also be combined. Let it be assumed that all these groups satisfy the requirement that the associated similarity factors are larger than the reference value V. In that case three or more transition functions can be combined. As will be apparent hereinafter, a combination of transition functions may mean that the (weighted) average of the transition functions in question is determined. But it is to be noted that different ways of combining transition functions are equally possible.

A second possibility is that a replacing transition function is derived from one or more groups (two or more transition functions) in the following ways: (i) one of the two transition functions of a group having a similarity factor larger than V is taken and functions as the replacing transition function of that group, or (ii) that transition function of the three or more transition functions of two or more groups with associated similarity factors larger than the reference value V which shows the greatest similarity to the other transition functions associated with the two or more groups, is taken and functions as the replacing transition function.

In the course of this description it will always be assumed that only two transition functions of one group will be combined and that a combined transition function will be calculated therefrom.

The method may be further characterized in that (c) the combined transition function replaces one of the two transition functions from which the combined transition function is derived and the other of the two transition functions is omitted, (d) in that subsequently similarity factors are determined between the combined transition function and the transition functions associated with instants in the proximity of the instant with which the combined transition function is associated, and in that the similarity factors associated with those combinations of two transition functions of which at least one is one of the two transition functions from which the combined transition function is derived, are omitted. It is then not important which of the two transition functions is replaced by the combined transition function.

The decision that two transition functions are (must be) combined may be taken in different ways.

For example, the reference value may initially be chosen such that it is between the values of the largest similarity factor and the largest similarity factor but one. In that case the two transition functions with the largest similarity factors are in fact combined.

The method may be further characterized in that (e) if there is subsequently at least one similarity factor which is larger than the aforementioned reference value, the transition functions associated with this similarity factor are combined and a combined transition function replacing the aforementioned two transition functions is derived from these two transition functions, whereafter the method is continued with step (c), (f) in that the reference value is decreased by a constant value if there are no similarity factors which are larger than the aforementioned reference value, (g) in that it is subsequently determined whether the reference value thus obtained is larger than a given constant, (h) in that the method is continued with step (e) if the reference value is larger than the said constant, and (i) in that the method is ended if the reference value is smaller than the said constant.

Another possibility is that the two transition functions with the largest similarity factor are combined. The previously mentioned reference value is then a fictitious number. In this case the method may be characterized in that it is determined whether the largest similarity factor is larger than a given constant, (e) in that, if the largest similarity factor is larger than this constant, a combined transition function is derived from the transition functions associated with this similarity factor, the combined transition function replacing the aforementioned two transition functions from which it is derived, whereafter the method is continued with step (c), and (f) in that the method is ended if the largest similarity factor is smaller than or equal to this constant.

If transition functions $\emptyset_i$ and $\emptyset_j$ are to be combined for the first time, the combined transition function $\emptyset_{ij}$ may be calculated, for example, by means of the following formula:

$$\emptyset_{ij}{}^c = (\emptyset_i + \emptyset_j)/2$$

Actually, the combined transition function is the average of the original transition functions $\emptyset_i$ and $\emptyset_j$ in this case.

If a combined transition function $\emptyset_{ij}{}^c$ is to be derived from transition functions $\emptyset_i$ and $\emptyset_j$ which themselves have been obtained in previous steps (b) and (e), respectively, of the method from combinations of transition functions, this combined transition function may be obtained, for example, as follows:

$$\emptyset_{ij}{}^c = (n_i\emptyset_i + n_j\emptyset_j)/(n_1 + n_j)$$

in which $n_i$ and $n_j$ indicate the numbers of the original transition functions from which the transition functions $\emptyset_i$ and $\emptyset_j$ respectively are obtained by combining two transition functions in one or more previous combination steps.

Actually, $\emptyset_{ij}{}^c$ is equal to the weighted average of $\emptyset_i$ and $\emptyset_j$ in this case and hence equal to the average of $n_i + n_j$ original transition functions. A new number n has now to be appended to the combined transition function. To this end the method is characterized in that a number $n_c$ which is equal to $n_i + n_j$ is appended to the combined transition function, which number $n_c$ indicates from how many original transition functions the combined transition function $\emptyset_{ij}{}^c$ has been obtained by combining two transition functions in one or more previous combination steps, in that the number $n_c$ replaces the number ($n_i$ or $n_j$) associated with the transition function ($\emptyset_i$ or $\emptyset_j$) which is replaced by the combined transition function, and in that the number ($n_j$ or $n_i$), which is associated with one of the two transition functions that is omitted, is also omitted.

For the calculation of the similarity factor between two transition functions, these transition functions may be considered to be vectors in a multidimensional space. One possibility then is to take the similarity factor to be equal to the reciprocal value of the euclidic distance between the ends of these vectors. A further possibility is to take the similarity factor to be equal to the cosine of the angle between the two vectors. In the latter case the said constant may be given a value between 0.5 and 0.8. The advantage is that variation of the constant within this range substantially does not have any influence on the (combined) transition functions ultimately obtained.

A device for performing the method, comprising
first means for deriving a number of parameters from the electric signal as a function of time, and
second means for deriving a transition function for each instant from the signals of the parameters located within the associated time interval, is characterized in that the device also comprises
a first memory for storing the transition functions,
third means for calculating a similarity factor between two transition functions associated with respective proximate instants i and j,
a second memory for storing the similarity factors, and
fourth means for deriving the replacing or combined transition function from the transition functions of at least one group of transition functions for which the associated similarity factor is larger than a reference value.

The parameters derived in the first means may be, for example: the formant parameters or the "log area" parameters. Formant parameters and "log area" parameters are known from the literature, see for example "Analysis, economical coding and speech resynthesis", the thesis by L. L. M. Vogten (1983) (in Dutch) and "Linear prediction of speech" by J. D. Markel and A. H. Gray (1976), Springer Berlin.

Furthermore the device may be characterized in that it comprises a decision unit having an input coupled to an output of the second memory and an output coupled to an address input of the first memory. The decision unit determines, for example, the maximum $c_{ij}$ and supplies at its output the ordinal numbers i and j of the largest similarity factor.

The device may also comprise a third memory for storing the numbers $n_i$ associated with the transition function $\phi_i$, the output of the decision unit being coupled to an address input of the third memory, an output of which is coupled to another input of the fourth means. Furthermore the fourth means may also be adapted to derive the number $n_c$ from the numbers $n_i$ and $n_j$ and to apply this number to a second output which is coupled to an input of the third memory.

BRIEF DESCRIPTION OF THE DRAWINGS

The invention will hereinafter be described in greater detail with reference to the accompanying drawing in which.

DESCRIPTION OF THE PREFERRED EMBODIMENTS

Figures 1, 2:
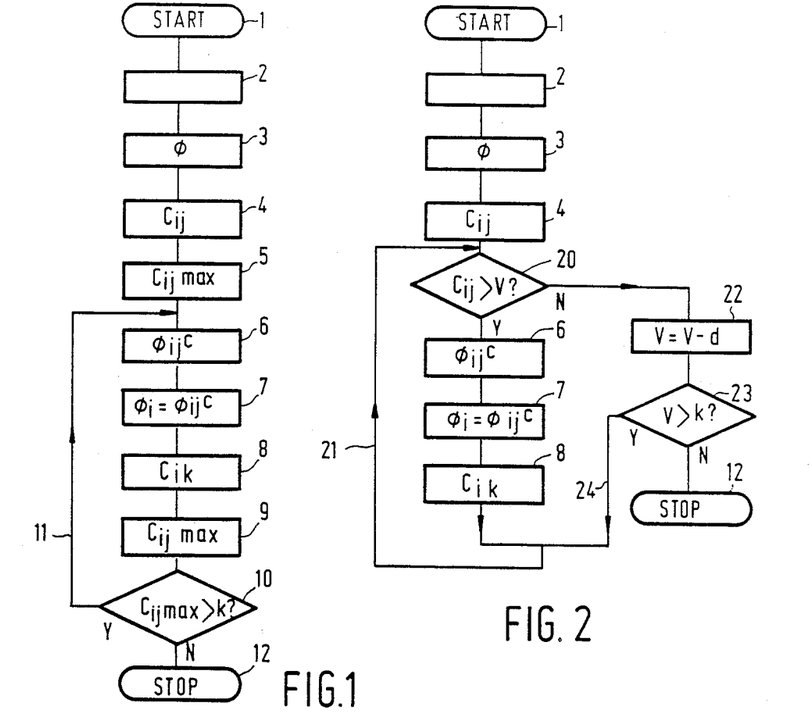
FIG. 1 shows a first example and
FIG. 2 shows a second example of the method.

FIG. 1 shows a first example of the method. The program is started in block 1. In block 2 the acoustic signal, for example a speech signal, is taken up and a number of parameters are derived as a function of time from this acoustic signal. As already previously mentioned these may be "log area" parameters. In block 3 the signals on the parameters located within a time interval around each instant are taken up for successive instants and for each instant a transition function $\phi$ is determined from the signals of the parameters located within the associated time interval. The instants may be spaced apart, for example, at 10 ms and an interval of 200 to 300 ms may be taken for the time interval. All transition functions are stored in a memory (the memory 38 in FIG. 7).

Figure 3:
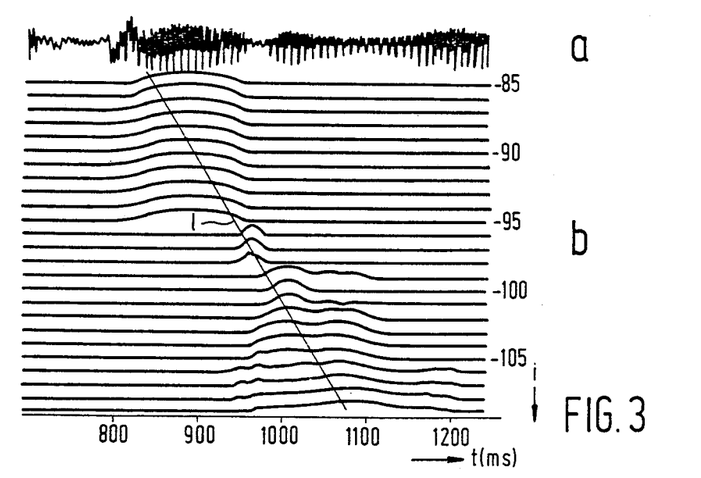
FIG. 3 shows transition functions associated with a number of instants as a function of time.

FIG. 3 shows in FIG. 3a a part of a speech signal as a function of time and FIG. 3b shows transition functions $\phi_i$ for successive instants i. The ordinal numbers of the transition functions are indicated on the right-hand side of FIG. 3b. The top transition function has the ordinal number 85. This means that this transition function is associated with the instant 850 ms in the example of the numbers stated above. The line 1 from the top left to the bottom right in FIG. 3b is the connecting line of the instants with which the different transition functions are associated.

Figure 7:
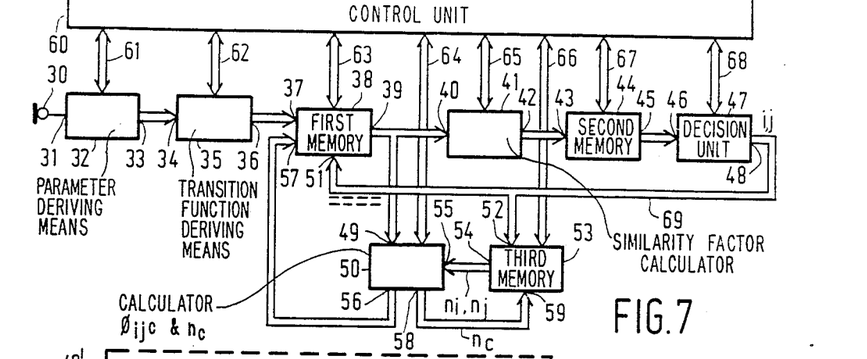
FIG. 7 shows an example of a device for performing the method.

In block 4 of FIG. 1 similarity factors $C_{ij}$ are calculated each between two transition functions associated with two proximate instants i and j (see the third means 41 in FIG. 7).

Figure 4:
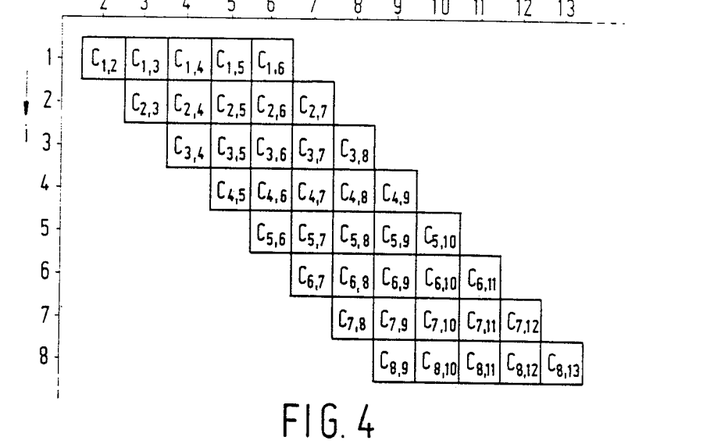
FIG. 4 shows a matrix containing the calculated similarity factors.

FIG. 4 shows for which combinations of two transition functions the similarity factors $C_{ij}$ are determined. An example: the following similarity factors are determined $C_{1,6}$, $C_{2,6}$, $C_{3,6}$, $C_{4,6}$, $C_{5,6}$, $C_{6,7}$ ($=C_{7,6}$), $C_{6,8}$ ($=C_{8,6}$), $C_{6,9}$ ($=C_{9,6}$), $C_{6,10}$ ($=C_{10,6}$) and $C_{6,11}$ ($=C_{11,6}$).

Then the similarity factors are known of a transition function associated with a given instant (j=6) with the transition functions associated with five proximate and hence ten surrounding instants i (=1 to 5 and 6 to 11). The calculated similarity factors $C_{ij}$ are stored in a memory (The memory 44 in FIG. 7).

The similarity factors may be determined by considering each time sample $\phi(m)$ of the transition functions as the mth component of a vector in a multi-dimensional space and by taking for a similarity factor the reciprocal value of the euclidic distance between the ends of the two relevant vectors. Another possibility is to take the cosine of the angle between the two relevant vectors for the similarity factor. Hence:

$$C_{ij} = \frac{\sum_m \phi_i(m) \phi_j(m)}{\sqrt{\sum_m \phi_i^2(m) + \sum_m \phi_j^2(m)}} \quad (1)$$

in which $\phi_i(m)$ and $\phi_j(m)$ represent the components of $\phi_i$ and $\phi_j$ at the same instant t=m and in which the summation is to be performed in those periods in which at least one of the two functions is non-zero.

Figure 5:
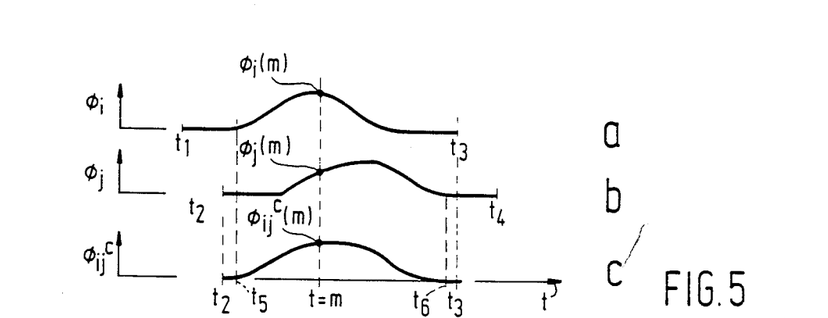
FIGS. 5 and 6 show two examples of combining two transition functions.

The calculation of $C_{ij}$ in accordance with formula (1) will be further explained with reference to FIGS. 5a, b and FIGS. 6a, b. FIG. 5a shows the transition function $\phi_i$ and FIG. 5b shows the transition function $\phi_j$, both as a function of time. The transition function $\phi_i$ is defined in the time interval ($t_1$, $t_3$) and the function $\phi_j$ is defined in the time interval ($t_2$, $t_4$). Actually, the addition in accordance with formula (1) is to be performed within the time interval ($t_1$, $t_4$). Since at least one of the functions is always non-zero at an instant within the time interval ($t_5$, $t_6$) the addition is to be performed only within this time interval ($t_5$, $t_6$).

Figure 6:
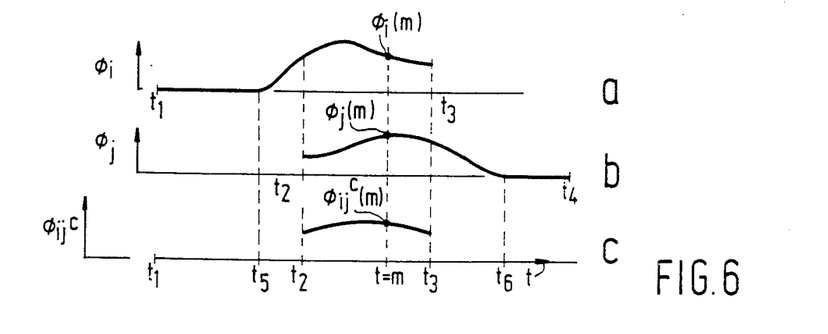

FIGS. 6a and 6b show transition functions $\phi_i$ and $\phi_j$ which are spaced apart over a greater distance. At an instant within the time interval ($t_5$, $t_6$) there is always at least one function which is non-zero. The addition is therefore to be performed in this time interval ($t_5$, $t_6$). This means that $\phi_i$ in the time interval ($t_3$, $t_6$) is supplemented (fictitiously) with zeroes and $\phi_j$ in the time interval ($t_5$, $t_2$) is supplemented (fictitiously) with zeroes, to obtain the correct vectors for calculating $C_{ij}$.

Subsequently it is determined in block 5 of FIG. 1 which similarity factor $C_{ij}$ is the largest. Then a combined transition function $\phi_{ij}^c$ is determined in block 6 from the two transition functions associated with the largest similarity factor $C_{ij}$. The following rules are then to be taken into account. The combined transition function is determined for the portion within which the two time intervals overlap each other. The combined transition function $\phi_{ij}^c$ is calculated from the (weighted) average of the two transition functions $\emptyset_i$ and $\emptyset_j$. When block 6 is traversed for the first time, this means that $$\emptyset_{ij}{}^c(m) = (\emptyset_i(m) + \emptyset_j(m))/2 \qquad (2)$$

FIG. 5 and FIG. 6 show two examples of calculating $\emptyset_{ij}{}^c$ in accordance with formula (2) in which FIGS. 5c and 6c show the combined transition functions obtained. The combined transition function $\emptyset_{ij}{}^c$ is thus calculated in the time interval between $t_2$ and $t_3$ and in this time interval it is equal to the average of the transition functions $\emptyset_i$ and $\emptyset_j$, see FIG. 5(c). The time intervals $(t_1, t_3)$ and $(t_2, t_4)$ in FIG. 6 are staggered over a longer distance. The time interval $t_2$, $t_3$ within which the combined transition function $\emptyset_{ij}{}^c$ is determined is therefore shorter than in the example of FIG. 5. Moreover, $\emptyset_{ij}{}^c$ is non-zero within the time interval $(t_2, t_3)$, see FIG. 6(c).

Subsequently one of the two transition functions $\emptyset_i$ or $\emptyset_j$, for example $\emptyset_i$, is replaced in block 7 by the combined transition function $\emptyset_{ij}{}^c$, i.e.

$$\emptyset_i \text{ (new)} = \emptyset_{ij}{}^c$$

The new transition function $\emptyset_i$ thus obtained is now stored in the memory 38 of FIG. 7 in the position in which the original transition function $\emptyset_i$ was stored. In addition, the transition function $\emptyset_j$ is erased from the memory.

In this respect it is to be noted that $\emptyset_j$ could also have been replaced by $\emptyset_{ij}{}^c$. $\emptyset_i$ would then have been erased.

Consequently, one transition function less is stored in the memory. In block 8 new similarity factors $C_{ik}$ are calculated between the new transition function $\emptyset_i$ and its surrounding transition functions, see the third means 41 in FIG. 7.

An example: let it be assumed that it has been determined in block 5 that $C_{6,7}$ had the highest value. In that case $\emptyset_{6,7}{}^c$ is calculated in the manner described hereinbefore and the original $\emptyset_6$ is replaced by $\emptyset_{6,7}{}^c$ and $\emptyset_7$ is erased. The following similarity factors are to be calculated again: $C_{1,6}$, $C_{2,6}$, $C_{3,6}$, $C_{4,6}$, $C_{5,6}$, $C_{6,8}$, $C_{6,9}$, $C_{6,10}$, $C_{6,11}$ and $C_{6,12}$ and the following similarity factors are to be removed from the table of FIG. 4: $C_{2,7}$, $C_{3,7}$, $C_{4,7}$, $C_{5,7}$, $C_{6,7}$, $C_{7,8}$, $C_{7,9}$, $C_{7,10}$, $C_{7,11}$ and $C_{7,12}$. All this because of the fact that $\emptyset_7$ is no longer present.

Subsequently the largest similarity factor is determined again in block 9 and in block 10 it is checked whether this largest similarity factor $C_{ijmax}$ is larger than a given constant k. If so, the programme returns via branch 11 to block 6 and a combined transition function $\emptyset_{ij}{}^c$ is calculated again.

Two transition functions may have to be combined, one (or both) of which has (have) been obtained at an earlier stage from a combination of previous transition functions.

An example: $C_{6,8}$ could now appear to be the largest similarity factor. This means that $\emptyset_6$ and $\emptyset_8$ are to be combined, while $\emptyset_6$ is obtained in the example described hereinbefore from a previous combination of the original transition functions $\emptyset_6$ and $\emptyset_7$.

In the calculation of the newly combined transition function $\emptyset_{6,8}{}^c$ this, will have to be taken into account by giving $\emptyset_6$ a greater importance. This is effected as follows:

$$\emptyset_{6,8}{}^c = (2.\emptyset_6 + \emptyset_8)/3$$

or, more generally $$\emptyset_{ij}{}^c = (n_i\emptyset_i + n_j\emptyset_j)/(n_i + n_j) \qquad (3)$$

in which $n_i$ and $n_j$ indicate the number of the original transition functions from which the transition functions $\emptyset_i$ and $\emptyset_j$ are obtained by combining two transition functions in one or more previous combination steps. For the sake of simplicity the time dependence has been omitted in the previous formulas.

A number $n_c$ is therefore associated with $\emptyset_{ij}{}^c$, which number is determined as follows:

$$n_c = n_i + n_j \qquad (4)$$

$n_c$ consequently indicates the number of the original transition functions from which the transition function $\emptyset_{ij}{}^c$ has been obtained by combining two transition functions in one or more previous combination steps. When $\emptyset_{ij}{}^c$ subsequently replaces the old $\emptyset_i$, then $n_c$ replaces the value $n_i$ associated with the old $\emptyset_i$ and together with the transition function $\emptyset_j$, the associated value $n_j$ is omitted. However, when $\emptyset_{ij}{}^c$ replaces $\emptyset_j$, the new $n_j$ becomes equal to $n_c$ and $n_i$ is omitted.

The programme loop via the branch 11 is repeated until there are no longer any similarity factors $C_{ij}$ which are larger than the constant k. In that case the programme proceeds from block 10 to block 12 and the method is ended.

If the similarity factors are calculated by means of formula (1), the constant k may be taken to be equal to a number between 0.5 and 0.8.

FIG. 2 shows a different method. The method proceeds via the blocks 1 to 4 in the same way as the method of FIG. 1. After determining the similarity factors $C_{ij}$ in block 4, it is checked in block 20 whether there is at least one similarity factor $C_{ij}$ which is larger than a given reference value V. If the similarity factors are determined in accordance with formula (1), V may be taken to be equal to, for example, 0.95. If there is a $C_{ij}$ which is larger than V, the programme proceeds through the blocks 6, 7 and 8 in the same way as described with reference to the method of FIG. 1 and the programme returns via the branch 21 to block 20. The programme loop via the branch 21 is traversed each time until there are no longer any similarity factors which are larger than V. The programme then proceeds via the block 20 to the block 22 in which the reference value V is decreased by a given quantity d of, for example, 0.05. Subsequently it is determined whether the reference value V thus obtained is larger than the previously mentioned constant k. If so, the programme returns via the branches 24 and 21 to block 20.

The loop comprising the blocks 6 to 8 is again traversed via the branch 21 until there are no longer any similarity factors which are larger than V. The programme then again proceeds via block 20 to block 22 in which the reference value is decreased again. This is continued until V is smaller than or equal to the constant k. The programme then proceeds via the block 23 to the block 12 and the method is ended.

At the instant when the block 20 was traversed for the first time, the reference value V could have been chosen to be such that it was between the largest $C_{ij}$ and the largest $C_{ij}$ but one. In that case the first combined transition function would have been calculated from the same two transition functions as if the method of FIG. 1 had been used for the same speech signal.

FIG. 7 shows an example of a device for performing the method, comprising a microphone 30 to which an acoustic signal, for example a speech signal, is applied. The microphone 30 is coupled to an input 31 of first means 32 for deriving a number of parameters, for example "log area" parameters, as a function of time from the electric signal presented by the microphone 30 to the input 31. An output 33 of the first means 32 is coupled to an input 34 of second means 35. The second means derive for each instant the associated transition functions from signals of the parameters located within the time interval associated with each instant, which parameters are applied by the first means 32 via the input 34 to the second means. An output 36 of the second means 35 is coupled to an input 37 of a first memory 38. In this memory 38 the transition functions which are calculated by the second means 35 are stored. The instant of commencement and the length of each transition function are also stored in this memory 38. This means for the examples of FIGS. 5 and 6: for $\emptyset_i$ the instant $t_1$ and the length $(t_1, t_3)$ and for $\emptyset_j$ the instant $t_2$ and the length $(t_2, t_4)$. An output 39 of the first memory is coupled to an input 40 of third means 41. The third means 41 are adapted to calculate the similarity factors $C_{ij}$ each time between two transition functions $\emptyset_i$ and $\emptyset_j$ associated with two proximate instants i and j. An output 42 of the third means 41 is coupled to an input 43 of a second memory 44. This memory 44 is adapted to store the similarity factors $C_{ij}$ calculated in the third means 41. An output 45 of the second memory 44 is coupled to an input 46 of a decision unit 47. The decision unit 47 is adapted to perform the steps indicated by the blocks 5 and 20 in the method of FIGS. 1 and 2, respectively. This means that according to block 5 in FIG. 1 the decision unit determines the largest factor $C_{ij}$ from the similarity factors $C_{ij}$ stored in the second memory 44. The associated ordinal numbers i and j subsequently appear at an output 48 of the decision unit 47, see also FIG. 9.

If the decision unit 47 were adapted to perform the step in accordance with block 20 in FIG. 2, then the decision unit 47 would comprise a comparator and it would be determined whether there was a similarity factor $C_{ij}$ which was larger than the reference value V. This can be realized by applying a similarity factor $C_{ij}$ and the reference value V to the two inputs of the comparator, see also FIG. 10. If there is a $C_{ij}$ larger than V, a control signal is supplied from the output of the comparator so that the associated ordinal numbers i and j appear at the output 48 of the decision unit 47.

The output 39 of the first memory 38 is also coupled to an input 49 of fourth means 50 for calculating the combined transition function $\emptyset_{ij}^c$ from the transition functions $\emptyset_i$ and $\emptyset_j$ from the first memory, applied via the input 49 to the fourth means 50. For reading the correct transition functions $\emptyset_i$ and $\emptyset_j$ from memory 38, the output 48 of the decision unit 47 with the information components relating to the ordinal numbers i and j of the transition functions which are to be combined, is coupled to an address input 51 of the memory 38. The output 48 is also coupled to an address input 52 of a third memory 53 in which the numbers $n_i$ associated with the transition functions $\emptyset_i$ are stored. An output 54 of the third memory 53 is coupled to a second input 55 of the fourth means 50. By applying the ordinal numbers i and j at the address input 52 to the third memory 53, the numbers $n_i$ and $n_j$ at the addresses i and j can be read in this memory 53 and applied via the output 54 to the input 55 of the fourth means 50.

Using formula (3) the fourth means 50 can now calculate the combined transition function $\emptyset_{ij}^c$ and using formula (4) it can calculate the new value $n_c$. $\emptyset_{ij}^c$ appears at a first output 56 which is coupled to a second input 57 of the first memory 38. $n_c$ appears at a second output 58 which is coupled to an input 59 of the third memory 53, see also FIG. 8.

When $\emptyset_{ij}^c$ is stored in the memory 38 in the position of $\emptyset_i$, $n_c$ is stored in the memory 53 in the position of $n_i$. The transition function $\emptyset_j$ and the number $n_j$ are erased from the memories 38 and 53, respectively. When $\emptyset_{ij}^c$ is stored in the memory 38 in the position of $\emptyset_j$, $n_j$ is accordingly replaced by $n_c$ in the memory 53 and $\emptyset_i$ and $n_i$ are erased from the memories 38 and 53, respectively. Furthermore the instant of commencement and the length of $\emptyset_{ij}^c$ are stored in the memory, together with $\emptyset_{ij}^c$. In the example of FIG. 5 or 6 this means: the instant $t_2$ and the length $(t_2, t_3)$.

The device is controlled from a central control unit 60. Electric leads 61 to 68 are provided between the control unit 60 and the various components, through which leads control signals can be applied from the control unit 60 to the various components and through which signals can be passed from the components to the control unit 60.

The control unit 60 ensures that after the start of the programme the first means 32 are activated via the lead 61 for deriving the ("LOG AREA") parameters. Subsequently the second means 35 are activated via the lead 62 for calculating the transition functions. Under the influence of control signals on the lead 63, these transition functions are stored in the first memory 38. Subsequently the third means 41 are activated under the influence of control signals on the lead 65 for calculating the similarity factors $C_{ij}$. The correct transition functions therefor are supplied by the first memory 38 under the influence of control signals which are applied via the lead 63 to the memory 38. The calculated similarity factors $C_{ij}$ are stored in the memory 44 under the influence of control signals applied via the lead 67 to this memory.

Under the influence of control signals applied via the lead 66 to the third memory 53, this memory is filled with ones only, $n_i=1$ for all i.

To perform the method as described with reference to FIG. 1, the decision unit determines the largest of the values stored in the memory 44 under the influence of a control signal on the lead 68. This can be realized, for example, with the circuit of FIG. 9 which will be described hereinafter.

To perform the method as described with reference to FIG. 2, the decision unit 47 determines under the influence of a control signal on the lead 68 a similarity factor $C_{ij}$ for which it holds that it is larger than a reference value V. This can be realized, for example, with the circuit of FIG. 10 which will also be described hereinafter.

The two ordinal numbers i and j associated with the maximum $C_{ij}$ and with the $C_{ij}$ which is larger than V, respectively, are then available at the output 48. This information is applied as an address signal via the lead 69 to the address inputs 51 and 52 of the memories 38 and 53, respectively.

Under the influence of these address signals and under the influence of control signals applied via the leads 63, 64 and 66 to the memory 38, the fourth means 50 and the third memory 53, respectively, the transition functions $\emptyset_i$ and $\emptyset_j$ associated with the ordinal numbers i and j and the numbers $n_i$ and $n_j$ are applied to the fourth means 50 in which the combined transition function $\emptyset_{ij}{}^c$ and the number $n_c$ are calculated.

Under the influence of control signals on the lead 63 $\emptyset_{ij}{}^c$ is subsequently stored in the position i (or just j) in the memory 38 and the position j (or just i) is erased in the memory 38. In the same manner, $n_c$ is stored in the memory 53 in the position i (or just j) and the position j (or just i) is erased in this memory under the influence of control signals on the lead 66.

Subsequently new similarity factors are determined in the third means 41 under the influence of control signals from the control unit 60 applied via the leads 63, 65, and 67 for combinations of the new transition function $\emptyset_i$ with transition functions associated with instants located around instant i, which new similarity factors are subsequently stored in the second memory. In addition the similarity factors for which one of the two ordinal numbers is equal to j are erased from the memory 44 under the influence of control signals from the control unit on the lead 67.

Figure 8:
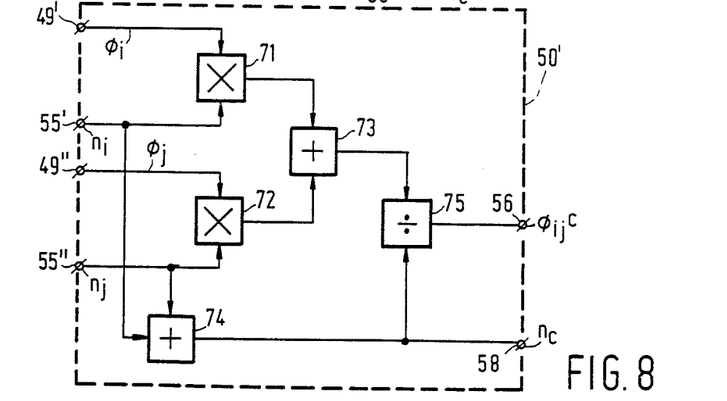
FIG. 8 shows a possible construction for the fourth means of FIG. 7.

The fourth means 50 may be formed, for example, as is shown in FIG. 8 and are indicated by the reference numeral 50'.

The input 49 consists of two partial inputs 49' and 49" via which the transition functions $\emptyset_i$ and $\emptyset_j$, respectively, are applied to the means 50'. The input 55 also consists of two partial inputs 55' and 55" via which the numbers $n_i$ and $n_j$, respectively, are applied. The inputs 49' and 55' are coupled to respective inputs of a multiplier 71. The inputs 49" and 55" are coupled to respective inputs of a multiplier 72. The inputs 55' and 55" are also coupled to respective inputs of an adder 74. The outputs of the multipliers 71 and 72 are coupled to respective inputs of an adder 73. The outputs of the adders 73 and 74 are coupled to respective inputs of a divider 75. The outputs of the divider 75 and the adder 74 are coupled to the outputs 56 and 58, respectively, of the means 50'. The means 50' described hereinbefore are capable of calculating $\emptyset_{ij}{}^c$ and $n_c$ in accordance with formulas (3) and (4), respectively.

Figure 9:
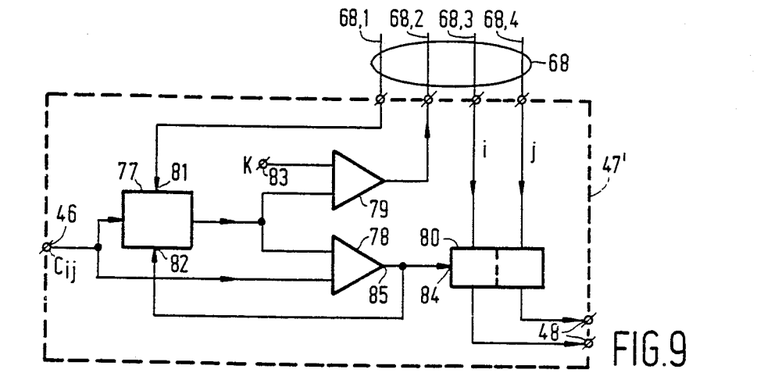
FIG. 9 shows a first possible construction and
FIG. 10 shows a second possible construction for the decision unit of FIG. 7.

FIG. 9 shows an example of the decision unit 47 suitable for use for the method of FIG. 1 and denoted by the reference numeral 47'. The decision unit 47' has a memory 77 and comparator 78 which together function as a maximum value determination unit.

Before starting to determine the maximum $C_{ij}$ for the first time in block 5 of FIG. 1, a reset signal is applied to the reset input 81 of the memory 77 from the central control unit 60 via the lead 68.1. The contents of the memory 77 are then equal to zero. Subsequently the first similarity factor $C_{ij}$ (i.e. $C_{12}$) is supplied from the input 46 to the input of the memory 77 and to an input of the comparator. The output of the memory 77 is coupled to another input of the comparator 78.

Assuming that $C_{12}$ is non-zero, the output of the comparator 78 becomes "high". This output is coupled to the write input 82 of the memory 77 and to the write input 84 of a two-position memory 80. Due to the output 85 becoming "high", the value $C_{12}$ is written in the memory 77 and the ordinal numbers i, j (being 1, 2) present on the leads 68.3 and 68.4 are stored i the memory 80. As there are now two equal numbers at the inputs of the comparator 78, the output 85 becomes low again.

The ordinal numbers of the subsequent similarity factor (for example, $C_{1,3}$) now appear on the leads 68.3 and 68.4 and this similarity factor appears at the input 46. If this similarity factor is smaller than or equal to the value stored in the memory 77, nothing happens and the ordinal numbers i, j associated with the similarity factor which is the largest up to that moment remain in the memory 80 and the value stored in the memory 77 is also maintained. If this similarity factor is larger than the value stored in the memory 77, this similarity factor is stored as a new value in the memory 77 and the associated ordinal numbers in the memory 80. This continues until all similarity factors have been applied via the input 46. The numbers i, j subsequently present at the output 48 indicate the ordinal numbers associated with the largest similarity factor. At that moment it is also checked whether $C_{ijmax}$ is larger than the constant k. To this end the output of the memory 77 is coupled to an input of a second comparator 79 to a second input of which the constant k is applied. When it is found that $C_{ijmax}$ is smaller than or equal to k, a control signal is applied via the lead 68.2 to the central control unit 60, whereafter the programme stops.

Figure 10:
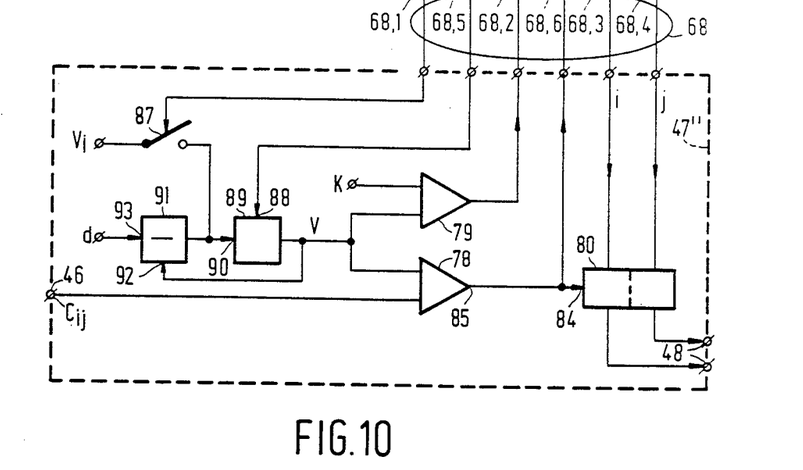

FIG. 10 shows an example of the decision unit 47 suitable for use in the method of FIG. 2 and denoted by the reference numeral 47". Before it is determined for the first time in block 20 whether a $C_{ij}$ is larger than V, control signals are applied from the central control unit 60 via the leads 68.1 and 68.5 to the decision unit 47". The control signal on the lead 68.1 closes the switch 87 for a short time. The control signal on the lead 68.5 is applied to a write input 88 of a memory 89. Since both control signals occur simultaneously, the initial reference value V (i.e. $V_i$) is consequently written in the memory 89. $V_i$ is equal to, for example, 0.95.

Subsequently the first similarity factor $C_{1,2}$ is applied via the input 46 to an input of the comparator 78. The output of the memory 89 is coupled to another input of the comparator 78. Let it be assumed that $C_{1,2}$ is smaller than or equal to $V_i$. The output 85 of the comparator 78 then does not apply a write signal to the write input 84 of the two-position memory 80. Subsequently the similarity factor $C_{1,3}$ is applied via the input 46. Let it be assumed that this $C_{1,3}$ is larger than $V_i$. The comparator 78 now applies a write signal to the memory 80 so that the ordinal numbers i, j (being 1, 3) are stored in this memory and are available at the output 48. In addition this write signal is applied via the lead 68.6 to the control unit 60 so that this unit detects that a similarity factor has been found which is larger than $V_i$. The control unit now causes the programme to proceed via the blocks 6, 7 and 8 in FIG. 2. When the steps in these blocks have been performed, the programme returns to block 20.

The programme can now cause the next $C_{i,j}$, hence from $C_{1,4}$ to be compared with $V_i$. Another possibility is to start comparing the $C_{i,j}$ with $V_i$ from $C_{1,2}$ again.

When it is found that all $C_{i,j}$ have been compared with $V_i$ and none of these $C_{i,j}$ is larger than $V_i$, a write pulse is again applied to the memory 89 via the lead 68.5.

The input 90 of the memory 89 is coupled to an output of a subtractor 91 having an input 92 which is coupled to the output of the memory 89 and a number d is applied to another input 93 (d is equal to, for example, 0.05). When the write pulse is applied write input 88, the number $V = V_i - d$ is thus written into the memory 89 (block 22 in FIG. 2).

Subsequently the similarity factors $C_{ij}$ are compared with the new reference value V. After block 22 in FIG. 2 has been traversed a number of times, V becomes smaller than or equal to k at a given instant. The comparator 79, one input of which is coupled to the output of the memory 89, then supplies a control signal via the lead 68.2 to the control unit 60 so that the programme is ended.

Figure 11:
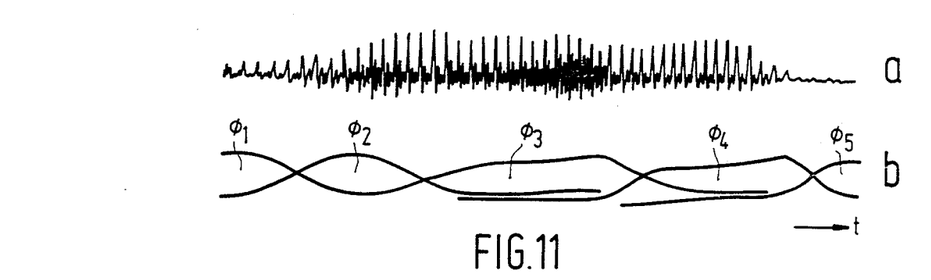
FIG. 11 shows a time signal with the associated transition functions as obtained ultimately by means of a method according to the invention.

The result of the methods described with reference to FIGS. 1 to 10 is that a limited number of transition functions remain of which generally only two proximate transition functions will partly overlap each other in time; see FIG. 11 in which FIG. 11a indicates the normal speech signal and FIG. 11b indicates the transition functions which have been obtained by means of one of the methods described.

Starting from these transition functions, the associated acoustic vectors can now be calculated, using formula (2) on page 4 of WO No. 84/04194, namely $$Y = A\emptyset \qquad (5)$$

in which Y represents a matrix whose columns denote the ("log area") parameters derived from the electric signal at the various instants, $\emptyset$ denotes the matrix whose rows are the aforementioned transition functions (to which zeroes have been added before and after the transition function so as to obtain a function during the entire utterance) and A also denotes a matrix whose columns represent the acoustic vectors (to be calculated).

The acoustic vectors thus obtained and their associated transition functions may now be used for transmission. A very efficient data reduction has been realized by means of one of the methods described. In fact, the transition functions are functions which slowly vary in time and which have a value which is non-zero for a short time only. Transmission can subsequently take place with a small data flow.

A further use of the acoustic vectors and transition functions obtained may be in the field of speech recognition. For this use the method has to be applied beforehand a large number of times to an equally large number of different utterances such that all sounds in the speech have been processed at least a number of times. A large number of acoustic vectors, say more than 1000, is then obtained.

By clustering these 1000 vectors, for example by means of the technique of vector quantization known from the literature (see R. M. Gray "Vector quantization" in IEEE ASSP magazine April 1984, page 4–29), a set of between 50 and 100 vectors is obtained which have a physical relevance because they can be related to the 50 to 100 distinguishable sounds from which the speech of a given language may be built up.

Speech recognition can now be realized by subjecting an unknown utterance to a method according to the invention and by subsequently comparing the acoustic vectors obtained with the aforementioned 50 to 100 physically relevant vectors.

In the comparison step the acoustic vectors are assigned after recognition to one of the 50 to 100 aforementioned vectors. As each vector is associated with a sound, it is also known which sounds the acoustic vectors of the unknown utterance are associated with, whereby the utterance is recognized.

A method according to the invention is also suitable for economical coding of diphones. Diphones are segments used in speech synthesis and describing the transitions between two speech sounds.

When the utterance from which the diphone segments are to be derived is analysed by means of a method according to the invention, a data reduction can also be obtained. Diphones are generally derived from nonsensical words such as, for example, the word "nenoone".

After using a method according to the invention for the word "nenoone", six transition functions with associated acoustic vectors may thus be expected, corresponding to the six sounds in this word, namely the sounds "n", "e", "n", "oo", "n" and "e".

Figure 12:
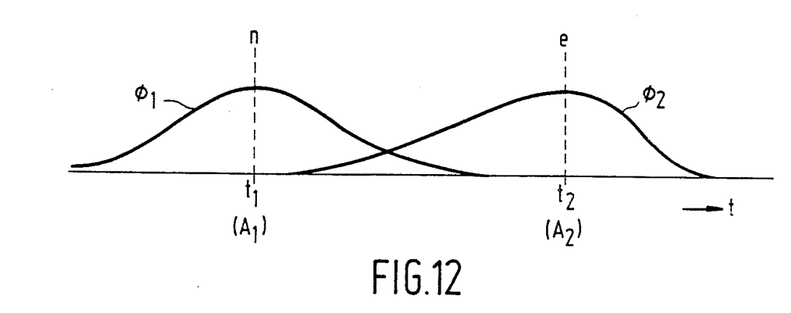
FIG. 12 shows the coding of a diphone, using transition functions and acoustic vectors obtained in accordance with a method according to the invention.

Thus, for the diphone "ne" the transition between the first and the second acoustic vector is required. This is shown in FIG. 12 FIG. 12 shows the transition functions $\emptyset_1$ and $\emptyset_2$ as a function of time, yielding acoustic vectors $A_1$, and $A_2$, respectively, using formula (5), which transition functions/acoustic vectors correspond to the sounds "n" and "e", respectively.

The "ne" diphone is now coded by storing the two acoustic vectors $A_1$ and $A_2$ and by storing that part of the two transition functions $\emptyset_1$ and $\emptyset_2$ which lies between $t_1$ and $t_2$, where $t_1$ and $t_2$ indicate, for example, the instants of the maximum values of the transition functions.

TABLE

Inscriptions in the blocks of FIGS. 1 and 2

| Block number | Inscription |
| --- | --- |
| 1 | start |
| 2 | derivation of (log area)-parameters |
| 3 | calculation of transition functions $\phi$ |
| 4 | calculation of similarity factors $C_{ij}$ |
| 5, 9 | determine largest $C_{ij}$ |
| 6 | calculate combined transition function $\phi_{ij}{}^f$ |
| 7 | replace one of original $\phi$'s by $\phi_{ij}{}^f$ and delete other of original $\phi$'s |
| 8 | calculate new similarity factors $C_{ik}$ |
| 10 | largest $C_{ij}$ larger than constant k? |
| 12 | stop |
| 20 | $C_{ij}$ larger than reference value V? |
| 22 | decrease V |
| 23 | V larger than constant k? |

What is claimed is:

1. A method of segmenting an electric signal derived from an acoustic signal into segments of the electric signal in which consecutively a number of parameters is derived from the electric signal in the form of a number of signals as a function of time, the signals of the parameters located within a time interval around each instant are taken up for consecutive instants, a transition function $\emptyset$ is determined for each instant from the signals of the parameters located within the time interval corresponding to said instant, and information relating to the segments of the acoustic signal is derived from the transition functions associated with the instants, characterized in that:

(a) similarity factors $C_{ij}$ are determined, each between two transition functions ($\emptyset_i$ and $\emptyset_j$) associated with respective proximate instants i and j, and (b) a replacing transition function is derived from the transition functions of at least one group of two transition functions for which the associated similarity factor is larger than a reference value V, the said replacing transition function replacing said transition functions from which it is derived.

2. A method as claimed in claim 1, characterized in that the reference value V is a number between the largest similarity factor and the next to the largest similarity factor.

3. A method as claimed in claim 1 or 2, in which in step (b) the two transition functions of only one group are combined and a combined transition function replacing the said two transition functions is derived from said two transition functions, characterized in that (c) the combined transition function replaces one of the two transition functions from which the combined transition function is derived and the other of the two transition functions is omitted,
   (d) in that subsequently similarity factors are determined between the combined transition function and the transition functions associated with instants in the proximity of the instant with which the combined transition function is associated, and in that the similarity factors associated with those combinations of two transition functions of which at least one is one of the two transition functions from which the combined transition function is derived, are omitted.

4. A method as claimed in claim 3, characterized in that (e) if there is subsequently at least one similarity factor which is larger than said reference value, the transition functions associated with such similarity factor are combined and a combined transition function replacing the aforementioned two transition functions is derived from the two transition functions, whereafter the method is continued with step (c),
   (f) in that the reference value is decreased by a constant value if there are no similarity factors which are larger than the reference value,
   (g) in that it is subsequently determined whether the reference value thus obtained is larger than a given constant,
   (h) in that the method is continued with step (e) if the reference value is larger than the said constant, and
   (i) in that the method is ended if the reference value is smaller than the said constant.

5. A method as claimed in claim 3, characterized in that it is determined whether the largest similarity factor is larger than a given constant,
   (e) in that, if the largest similarity factor is larger than said constant, a combined transition function is derived from transition functions associated with this similarity factor, the combined transition function replacing the said two transition functions from which it is derived whereafter the method is continued with step (c), and
   (f) in that the method is ended if the largest similarity factor is smaller than or equal to said constant.

6. A method as claimed in claim 1 or 2, in which in step (b) the two transition functions of only one group are combined and a combined transition function replacing said two transition functions is derived from these two transition functions, characterized in that in step (b) the combined transition function $\emptyset_{ij}{}^c$ is calculated in the following manner from the two transition functions $\emptyset_i$ and $\emptyset_j$, $$\emptyset_{ij}{}^c = (\emptyset_i + \emptyset_j)/2$$

7. A method as claimed in claim 4 or 5, characterized in that in step (e) the combined transition function $\emptyset_{ij}{}^c$ is calculated from the two transition functions $\emptyset_i$ and $\emptyset_j$ in the following manner:

$$\emptyset_{ij}{}^c = (n_i\emptyset_i + n_j\emptyset_j)/(n_i + n_j)$$

in which $n_i$ and $n_j$ indicate numbers of the original transition functions from which the transition functions $\emptyset_i$ and $\emptyset_j$ respectively are obtained by combining two transition functions in one or more previous combination steps.

8. A method as claimed in claim 7, characterized in that a number $n_c$ which is equal to $n_i + n_j$ is appended to the combined transition function, which number $n_c$ indicates from how many original transition functions the combined transition function $\emptyset_{ij}{}^c$ has been obtained by combining two transition functions in one or more previous combination steps,
   in that the number $n_c$ replaces the number ($n_i$ or $n_j$) associated with the transition function ($\emptyset_i$ or $\emptyset_j$) which is replaced by the combined transition function, and in that the number ($n_j$ or $n_i$), which is associated with the one of the two transition functions that is omitted, is also omitted.

9. A method as claimed in claim 1 or 2, characterized in that for calculating the similarity factor $C_{ij}$ between two transition functions $\emptyset_i$ and $\emptyset_j$, the transition functions are considered to be vectors in a multidimensional space and in that the similarity factor is equal to the reciprocal value of the euclidic distance between ends of said vectors.

10. A method as claimed in claim 4, characterized in that for calculating the similarity factor $C_{ij}$ between two transition functions $\emptyset_i$ and $\emptyset_j$ the transition functions are considered to be vectors in a multidimensional space and in that the similarity factor is equal to the cosine of the angle between the two vectors.

11. A method as claimed in claim 10, characterized in that the said constant has a value of between 0.5 and 0.8.

12. A device for segmenting an electric signal derived from an acoustic signal comprising:
   first means for deriving a number of parameters in the form of signals from the electric signal as a function of time,
   second means for deriving a transition function for each instant from the signals of the parameters located within a time interval corresponding to said instant,
   a first memory for storing the transition functions,
   third means for calculating a similarity factor between two transition functions associated with respective proximate instants i and j,
   a second memory for storing the similarity factors, and
   fourth means for deriving a replacing or combined transition function from the transition functions of at least one group of transition functions for which the associated similarity factor is larger than a reference value.

13. A device as claimed in claim 12, further comprising a decision unit having an input coupled to an output of the second memory and an output coupled to an address input of the first memory.

14. A device as claimed in claim 12 or 13, characterized in that an output of the first memory is coupled to an input of the fourth means, and means coupling an output of the fourth means to an input of the first memory.

15. A device as claimed in claim 12 or 13 which further comprises a third memory for storing numbers $n_i$ associated with transition functions $\emptyset_i$, means coupling the output of the decision unit to an address input of the third memory, and means coupling an output of the third memory to another input of the fourth means.

16. A device as claimed in claim 15, wherein the fourth means are also adapted to derive a number $n_c$ from numbers $n_i$ and $n_j$ and to apply said number to a second output, that is coupled to an input of the third memory.

17. A device as claimed in claim 14 further comprising: a third memory for storing numbers $n_i$ associated with transition functions $\emptyset_i$, means coupling the output of the decision unit to an address input of the third memory, and means coupling an output of the third memory to another input of the fourth means.

18. A device as claimed in claim 17 wherein said fourth means derives a number $n_c$ from numbers $n_i$ and $n_j$ and applies said number $n_c$ to a second output that is coupled to an input of the third memory.

* * * * *